US012756580B2

(12) United States Patent
Targali et al.

(10) Patent No.: US 12,756,580 B2
(45) Date of Patent: Oct. 6, 2026

(54) SYSTEMS AND METHODS FOR DISAGGREGATED CRYPTOGRAPHIC SOFTWARE ARCHITECTURE

(71) Applicant: VERIZON PATENT AND LICENSING INC., Basking Ridge, NJ (US)

(72) Inventors: Yousif Targali, Sammamish, WA (US); Said Soulhi, Saint Cloud, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 163 days.

(21) Appl. No.: 18/618,463

(22) Filed: Mar. 27, 2024

(65) Prior Publication Data

US 2025/0310118 A1 Oct. 2, 2025

(51) Int. Cl.

*H04L 9/32* (2006.01)
*G06F 11/34* (2006.01)
*H04L 9/08* (2006.01)

(52) U.S. Cl.

CPC ........ *H04L 9/3247* (2013.01); *G06F 11/3409* (2013.01); *H04L 9/0852* (2013.01)

(58) Field of Classification Search

None
See application file for complete search history.

(56) References Cited

U.S. PATENT DOCUMENTS

| | | | | |
|---|---|---|---|---|
| 2004/0193918 | A1* | 9/2004 | Green | H04L 63/1433 726/22 |
| 2007/0239604 | A1* | 10/2007 | O'Connell | G06F 21/55 705/50 |
| 2008/0276295 | A1* | 11/2008 | Nair | H04L 41/044 726/1 |
| 2012/0240235 | A1* | 9/2012 | Moore | H04L 63/1433 726/25 |
| 2017/0352027 | A1* | 12/2017 | Zhang | G06Q 20/3678 |
| 2020/0280436 | A1* | 9/2020 | Nix | H04L 9/0869 |
| 2021/0297441 | A1* | 9/2021 | Olalere | H04L 63/1408 |

* cited by examiner

*Primary Examiner* — William J. Goodchild

(57) ABSTRACT

Disclosed are systems and methods for a cryptographic inventory management (CIM) framework that enables cryptography agility with regards to network security requirements regarding threats from/of quantum computing and artificial intelligence (AI). The disclosed CIM framework can support a mixture of algorithm types, such as, but not limited to, classical, lattice based, code based, isogeny based and the like, which makes switching between cryptographic algorithms efficient, secure and smooth. The disclosed framework can provide a centralized cryptography inventory system (e.g., keys, algorithms, protocols, libraries, crypto-accelerators) that can be compiled, updated and maintained, and can include all the cryptography assets of network functions and support network functions regardless whether they are physical or virtual, quantum vulnerable or not, and the like. The CIM framework can be compiled and implemented as a centralized cryptography system that is built and maintained via automated cryptography assets discovery tools.

18 Claims, 10 Drawing Sheets

300

| 5G NF | Crypto Used | Crypto State | Upgradable | PQ Crypto |
|---|---|---|---|---|
| gNB-UP | AES-128 | PC | Y | AES-256 |
| gNB-CP | AES-128 | PC | Y | AES-256 |
| gNB-MP | TLS 1.2 | NC | Y | PQC-TLS 1.2/1.3 |
| gNB-MP | SSHv2 | NC | Y | PQC-SSH |

FIG. 6

SYSTEMS AND METHODS FOR DISAGGREGATED CRYPTOGRAPHIC SOFTWARE ARCHITECTURE

BACKGROUND INFORMATION

The Third Generation Partnership Project (3GPP) primarily focuses on standardizing mobile communication systems and related technologies, such as cellular networks and protocols. 3GPP can incorporate cryptographic protocols, such as security features and mechanisms to protect users' communications and data.

BRIEF DESCRIPTION OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 depicts a non-limiting example embodiment according to some embodiments of the present disclosure;

DETAILED DESCRIPTION OF EXAMPLE EMBODIMENTS

Figure 1A:
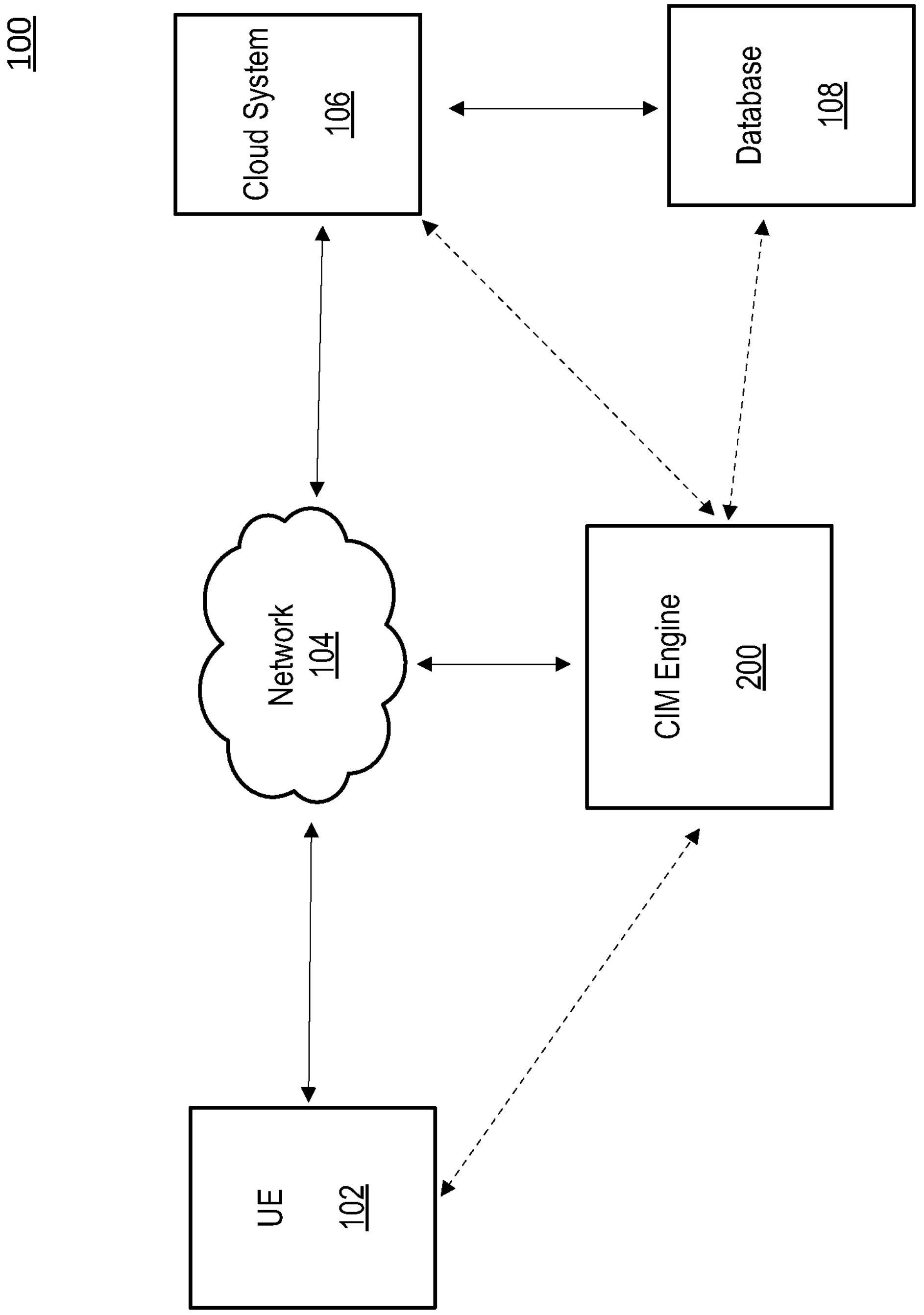
FIG. 1A is a block diagram of an example network architecture according to some embodiments of the present disclosure.

Within 3GPP specifications, cryptographic protocols can play a role in ensuring the confidentiality, integrity and authenticity of communications in wireless (e.g., mobile) networks. Such protocols, for example, can be used for tasks such as secure authentication, encryption of user data, key exchange, protection against various security threats, and the like. For example, some cryptographic protocols commonly employed in 3GPP standards can include, but are not limited to, LTE/5G Security, Internet Protocol Security (IPsec), Transport Layer Security (TLS), encryption algorithms, and the like. Accordingly, 3GPP can incorporate and standardize various cryptographic mechanisms and protocols within its specifications to ensure the security of wireless communication systems.

Currently, however, 3GPP inventory management Integration Reference Point (IRP) lacks functionality for handling cryptographic information. Resulting in a need for cryptography agility to increase security and post quantum proof capability. Post-quantum proof capability refers to the resilience of a cryptographic system against attacks from quantum computers. Quantum computers have the potential to significantly weaken traditional cryptographic algorithms, such as RSA and Elliptic Curve Cryptography (ECC), by leveraging quantum algorithms, such as, for example, Shor's algorithm, to efficiently factor large numbers or solve the discrete logarithm problem.

Post-quantum cryptography (PQC) aims to develop cryptographic algorithms that remain secure even in the presence of quantum computers. These algorithms typically rely on different mathematical principles than those used in traditional cryptography. Examples of post-quantum cryptographic schemes include lattice-based cryptography, code-based cryptography, hash-based cryptography, multivariate polynomial cryptography and the like.

A "post-quantum proof capability" involves a cryptographic system or protocol that is designed with algorithms that are secure against attacks from both classical and quantum computers. This capability is increasingly important as the development of quantum computers progresses and poses a potential threat to current cryptographic standards.

Accordingly, as discussed herein, the disclosed systems and methods provide a cryptographic inventory management (CIM) framework that, among other technical benefits discussed herein, enables cryptography agility with regard to network security requirements given the new and increasing quantity and complexity of threats of quantum computing and artificial intelligence (AI). The disclosed CIM framework can support a mixture of algorithm types, such as, but not limited to, classical, lattice based, code based, isogeny based and the like, which makes switching between cryptographic algorithms efficient, secure and smooth.

According to some embodiments, the disclosed framework can provide a centralized cryptography inventory system (e.g., keys, algorithms, protocols, libraries, crypto-accelerators) that can be compiled, updated and maintained, and can include the needed cryptography assets of network functions and support network functions regardless whether they are physical or virtual, quantum vulnerable or not, and the like. As discussed herein, the CIM framework can be compiled and implemented as a centralized cryptography system that is built and maintained via automated cryptography assets discovery tools.

With reference to FIG. 1A, system 100 is depicted which includes user equipment (UE) 102, network 104, cloud system 106, database 108, and CIM engine 200. It should be understood that while system 100 is depicted as including such components, it should not be construed as limiting, as one of ordinary skill in the art would readily understand that varying numbers of UEs, engines, cloud systems, databases and networks can be utilized; however, for purposes of explanation, system 100 is discussed in relation to the example depiction in FIG. 1A.

According to some embodiments, UE 102 can be any type of network device, as discussed above. In some embodiments, as mentioned below, UE 102 can correspond to a network entity, for example, a network function (NF).

In some embodiments, for example, UE 102 can include, but not be limited to, a mobile phone, tablet, laptop, game console, smart television (TV), Internet of Things (IoT) device, wearable device, an autonomous vehicle (AV), autonomous machine, unmanned aerial vehicle (UAV), and/or any other device equipped with a cellular or wireless or wired transceiver.

In some embodiments, network 104 can be any type of network, such as, but not limited to, a wireless network, cellular network, the Internet, and the like (as discussed above). Network 104 facilitates connectivity of the components of system 100, as illustrated in FIG. 1A. Further discussion of embodiments of network 104 are provided below with reference to FIG. 8.

According to some embodiments, cloud system 106 may be any type of cloud operating platform and/or network-based system upon which applications, operations, and/or other forms of network resources may be located. For example, system 106 may be a service provider and/or network provider from where services and/or applications may be accessed, sourced or executed from. For example, system 106 can represent the cloud-based architecture associated with a cellular provider, which has associated network resources hosted on the internet or private network (e.g., network 104), which enables (via engine 200) the CIM operations discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102 and the services and applications provided by cloud system 106 and/or engine 200).

In some embodiments, for example, cloud system 106 can provide a private/proprietary management platform, whereby CIM engine 200, discussed infra, corresponds to the novel functionality system 106 enables, hosts and provides to a network 104 and other devices/platforms operating thereon.

According to some embodiments, database 108 may correspond to a data storage for a platform (e.g., a network hosted platform, such as cloud system 106, as discussed supra) or a plurality of platforms. Database 108 may receive storage instructions/requests from, for example, CIM engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

CIM engine 200, as discussed above and further below in more detail, can include components for the disclosed functionality. According to some embodiments, CIM engine 200 may be a special purpose machine or processor, and can be hosted by a device (or component) on network 104, within cloud system 106 and/or on UE 102. In some embodiments, CIM engine 200 may be hosted by a server and/or set of servers associated with cloud system 106.

According to some embodiments CIM engine 200 may be configured to implement and/or control a plurality of services and/or microservices, where each of the plurality of services/microservices are configured to execute a plurality of workflows associated with performing the disclosed connection management. Non-limiting embodiments of such workflows are provided below.

According to some embodiments, CIM engine 200 may function as an application provided by and/or hosted by cloud system 106. In some embodiments, CIM engine 200 may function as an application installed on a server(s), network location and/or other type of network resource associated with system 106. In some embodiments, CIM engine 200 may function as an application installed and/or executing on UE 102. In some embodiments, such application may be a web-based application accessed by UE 102. In some embodiments, CIM engine 200 may be configured and/or installed as an augmenting script, program or application (e.g., a plug-in or extension) to another application or program provided by cloud system 106 and/or executing on UE 102.

Figure 1B:
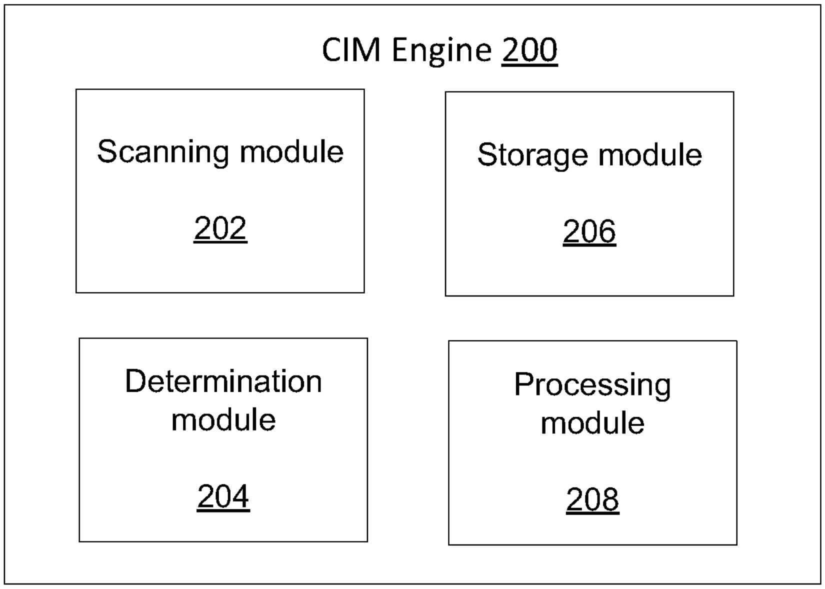
FIG. 1B is a block diagram illustrating components of an exemplary system according to some embodiments of the present disclosure.

As illustrated in FIG. 1B, according to some embodiments, CIM engine 200 includes scanning module 202, determination module 204, storage module 206 and processing module 208. It should be understood that the modules discussed herein are non-exhaustive, as additional or fewer modules (or sub-modules) may be applicable to the embodiments of the systems and methods discussed. More detail of the operations, configurations and functionalities of CIM engine 200 and each of its modules, and their role within embodiments of the present disclosure will be discussed below.

Figure 2:
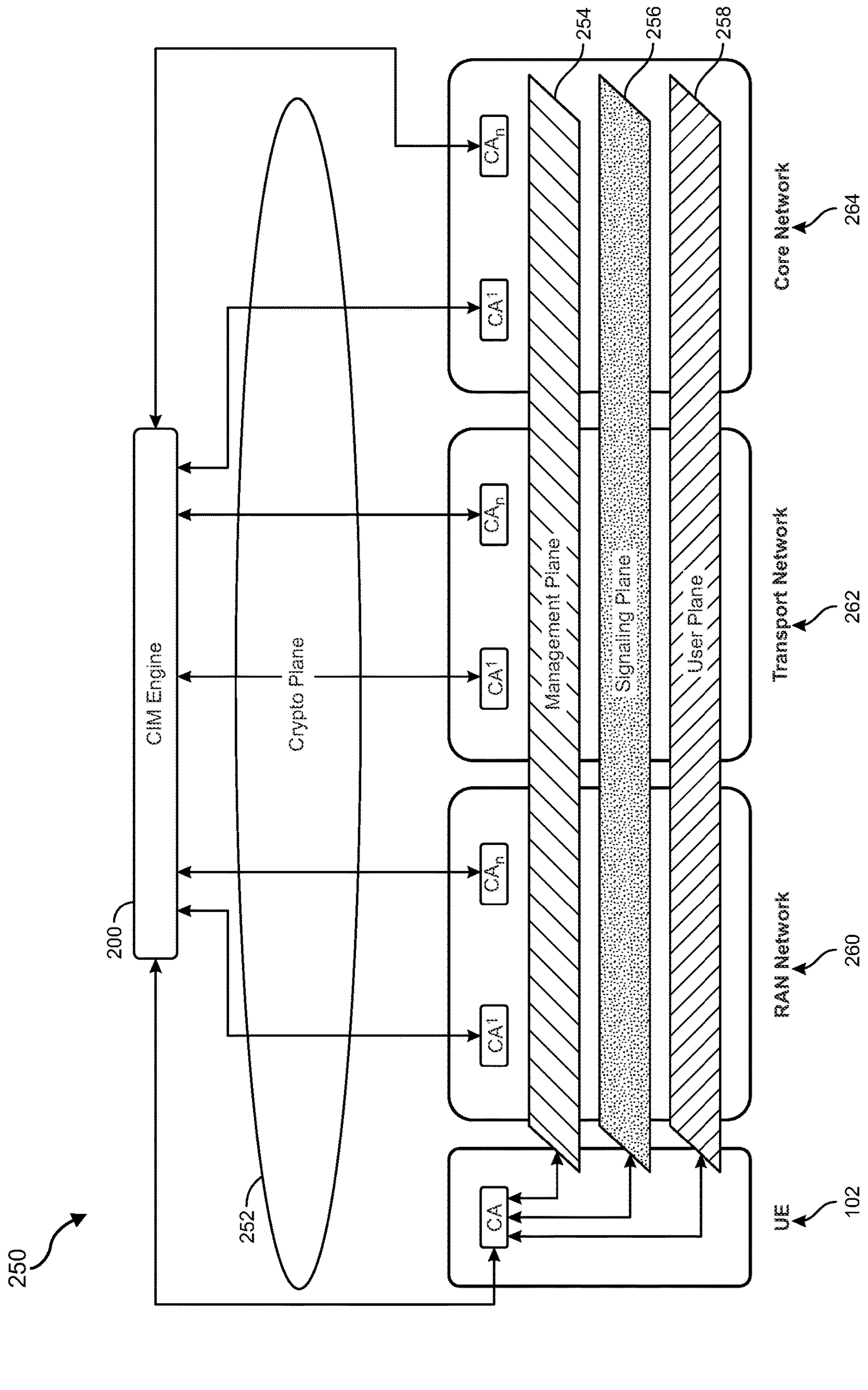
FIG. 2 depicts a non-limiting example embodiment of a network configuration according to some embodiments of the present disclosure.

FIG. 2 depicts a non-limiting example embodiment for the implementation of the CIM framework 250 as a cryptographic knowledge plane within existing network infrastructures. CIM framework 250 includes CIM engine 200, crypto plane 252, management plane 254, signaling plane 256, user plane 258, UE 102, radio access network (RAN) network 260, transport network 262 and core network 264.

CIM framework 250 can also include a plurality of cryptography agents (CAs), which as depicted in FIG. 2, can be used by engine 200 to communicate to/from and/or between the planes of a network. A CA, which can be for each plane in framework 250, serves as a vital component facilitating secure communication across various planes of a network. CAs can undertake crucial cryptographic functions such as encryption, decryption, digital signatures and key management. In the user plane (UP) 258, where user data traverses the network, cryptography agents encrypt data packets before transmission, safeguarding them from unauthorized access or modification. Furthermore, in the management plane (MP) 254 and signaling plane (SP) 256, which are respectively responsible for network management and signaling, CAs can ensure the confidentiality and integrity of communication by encrypting signaling messages.

According to some embodiments, key management forms another critical aspect wherein CAs establish secure channels for exchanging cryptographic keys between network devices (e.g., UE 102 and/or network functions (NFs), for example), ensuring secure encryption and decryption operations.

Moreover, in the management plane 254, CAs can generate and verify digital signatures, bolstering authentication and integrity assurance for configuration commands and management messages exchanged between administrators and devices. In virtual private network (VPN) setups, CAs can handle encryption and decryption of VPN traffic, securing communication between remote sites or endpoints over the public Internet.

Accordingly, CAs, through their diverse roles, operate to fortify network security, guaranteeing the confidentiality, integrity and authenticity of network communications across different planes for different types of networks and/or device operations.

Figure 7:
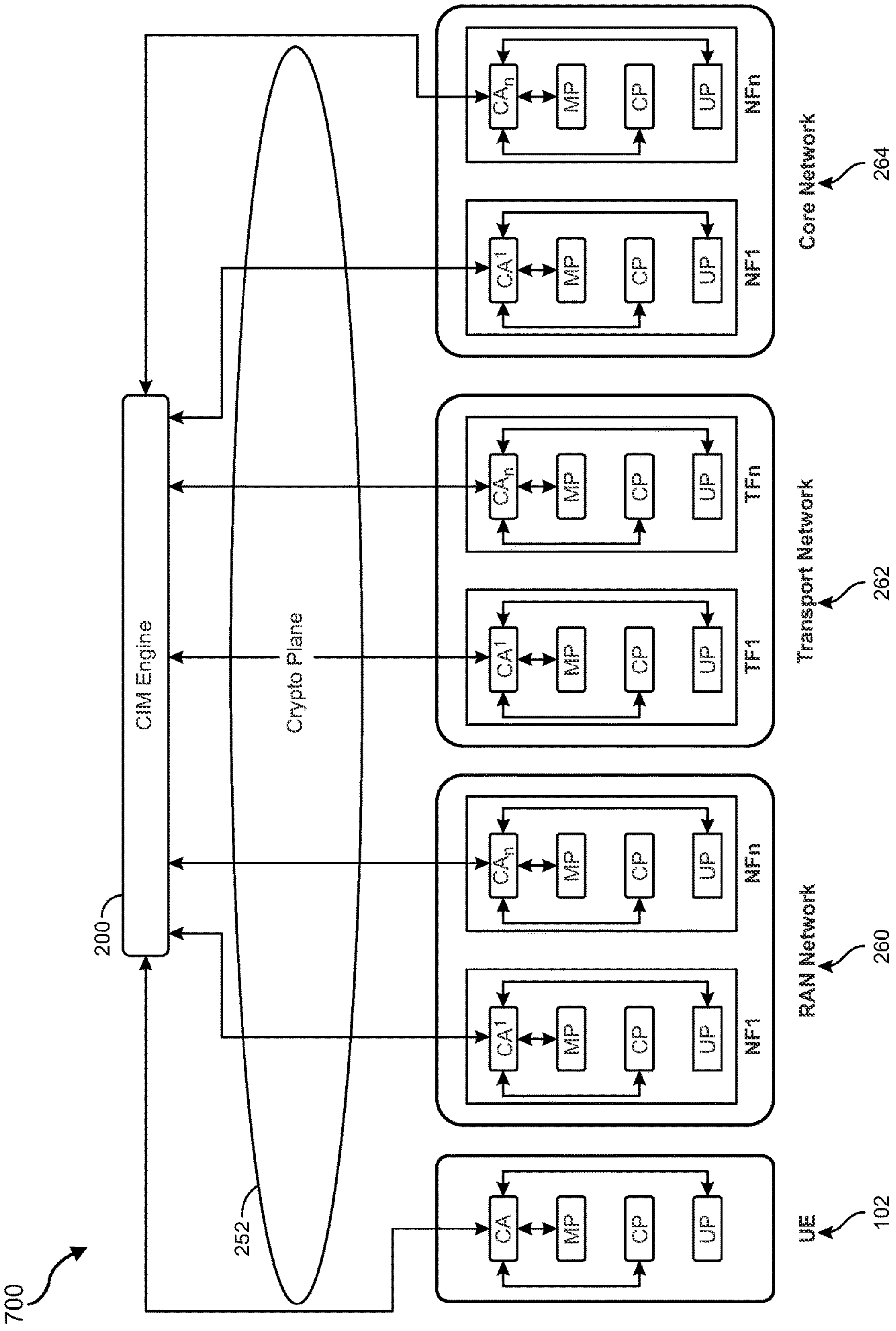
FIG. 7 depicts a non-limiting example embodiment of a network configuration according to some embodiments of the present disclosure.

In some embodiments, the (new) crypto plane 252 can be built as a representation of the three-dimensions (3D) of the network: UP 258, SP 256 and MP 254. For example, as depicted in FIG. 7, upon configuration of the crypto plane 252, as discussed below, CIM engine 200 can utilize crypto plane 252 as a representation of the 3D composite of the UP 258, SP 256 and MP 254, whereby each NF of a particular network and/or device/entity can correlate its functionality in relation to a respective CA. Such functionality is discussed below.

According to some embodiments, CIM engine 200 is configured to discover and scan cryptography configurations for network functions (NFs) deployed within and/or across the network (e.g., on the core network, for example). Such scanning can be enabled via specific CAs, which as depicted in FIG. 2, can be related to particular devices or networks (e.g., UE 102, RAN 260, transport network 262, core network 264). As discussed below, CIM engine 200 can provide NFs that are PQC compliant, partially compliant and non-compliant in UP 258, SP 256 and/or MP 254. Moreover, engine 200 enables NFs to switch cryptography algorithms to comply with requested and/or executable functionality (e.g., from classical to post quantum, from classical to hybrid, for example). Accordingly, the operation and implementation of CIM engine 200 within framework 250 via crypto plane 252 is discussed below.

Figure 3:
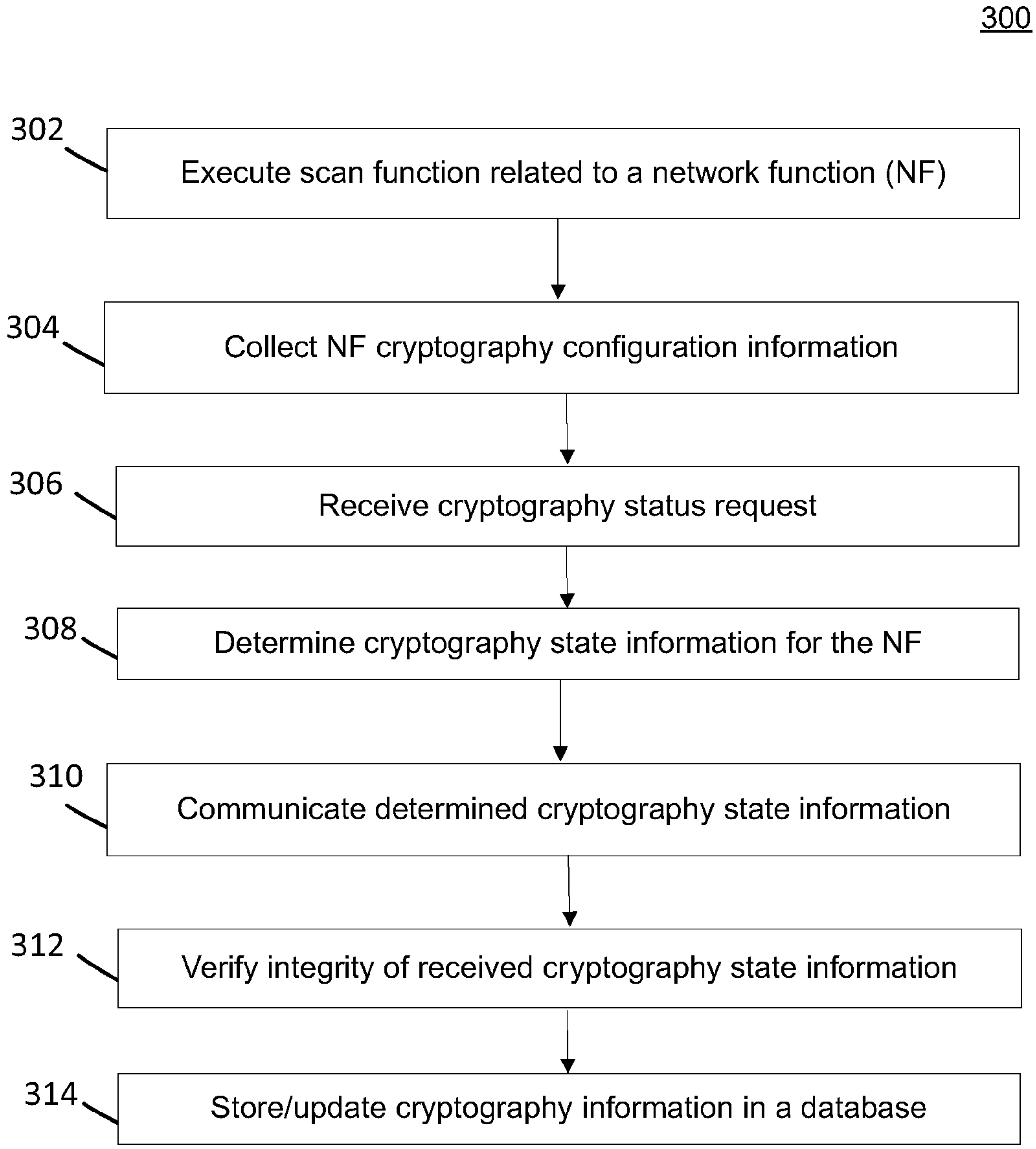
FIG. 3 illustrates an exemplary workflow according to some embodiments of the present disclosure.

In FIG. 3, Process 300 provides non-limiting example embodiments for implementing the disclosed CIM. As discussed herein, Process 300 provides novel capabilities for an automated cryptography inventory database and application program interface (API), which enables functionality for locating and switching between encryption algorithms, protocols, key formats, and the like. In some embodiments, CIM engine 200 enables information management decisions and processing to be taken to the backend of a network, which enables such decisions (e.g., which algorithms to utilize) to be transparent to the applications and NFs running on the network.

According to some embodiments, Steps 302-306 of Process 300 can be performed by scanning module 202 of CIM engine 200; and Steps 308-312 can be performed by determination module 204; and Step 314 can be performed by storage module 206.

According to some embodiments, Process 300 begins with Step 302 where a scan function related to a network function (NF) is executed (e.g., scanning a network for information related to a NF(s)). It should be understood that the scan function can be respective to a plurality of NFs on the network; however, for purposes of discussion, a single NF will be discussed. It should be readily recognized that such discussion can be expanded for any number of NFs.

In some embodiments, Step 302 can involve a CA for a particular plane (e.g., UP, SP, MP) performing discovery and scan operations. That is, in some embodiments, a CA for the NF can scan a network to discover cryptography configurations through several steps. First, in some embodiments, the CA can begin by enumerating the entities (e.g., NFs) and systems within the network. This may involve using network scanning tools or protocols such as ICMP (Internet Control Message Protocol), SNMP (Simple Network Management Protocol), or LLDP (Link Layer Discovery Protocol) to identify active hosts and entities. Once entities are identified, the CA can attempt to authenticate with them using appropriate credentials. This may involve using standard authentication mechanisms such as username/password, SSH (Secure Shell), or SNMP community strings, depending on the protocols supported by the entities.

According to some embodiments, after successful authentication, the CA can query the entities to gather information about their configurations. This can include retrieving configuration files, querying system settings, or accessing management interfaces to gather relevant cryptographic parameters. In some embodiments, the CA can parse the configuration data obtained from the entities to identify cryptographic settings and parameters. This can include, but is not limited to, extracting information such as encryption algorithms, key lengths, certificate authorities, digital certificate configurations, VPN settings, and any other cryptographic parameters configured on the entities.

In some embodiments, once cryptographic configurations are identified, the CA can analyze the configurations to assess their security posture and compliance with best practices and organizational policies. In some embodiments, this may involve comparing configurations against known vulnerabilities, compliance standards (such as FIPS 140-2), or recommended cryptographic guidelines. In some embodiments, the policies can be cryptography policies for network entities (e.g., a NF basket of supported classical/post-quantum/hybrid cryptography algorithms for the UP, MP and/or SP, and the like—for example, radio to data center integration via Kyber security level 4.

Accordingly, in some embodiments, the CA can generate a report detailing the discovered cryptographic configurations, including any identified vulnerabilities or deviations from best practices. As discussed below, based on the findings, remediation actions may be recommended, such as updating configurations, patching vulnerabilities, or implementing additional security controls.

In some embodiments, Step 302 can involve leveraging (or creating) the cryptography knowledge plane (as discussed above in FIG. 2, crypto plane 252). As mentioned above, the cryptography knowledge plane is a 3D composite for the UP, SP and MP, and provides functionality for the disaggregation between cryptography software (algorithms) and NFs to enable cryptography agility and compliance with PQC. In some embodiments, the engine 200 can leverage generative modelling with graph neural networks (GNNs), for example to implement the cryptography management via the cryptography knowledge plane.

In some embodiments, such modelling can involve performing feature engineering of the network as a graph that captures each node and each node's relationships. A vector node can then be generated that captures embeddings based on local network neighborhoods (e.g., networks 260, 262 and 264 as illustrated in FIGS. 2 and 7, for example). Engine 200 can then perform node aggregation processing via execution of neural networks (NNs, for example GNNs), whereby a representation of each node can be output. This output, as discussed above and provided below, can be leveraged to extract NF cryptography configuration information. Moreover, in some embodiments, such output can be used to train the GNN, for example, to perform anomaly detection related to clusters of entities within planes on the network (e.g., cryptography software bugs, for example).

Thus, as discussed herein, by systematically scanning and analyzing network entities' configurations, a cryptography agent can effectively discover cryptographic settings and assess the security posture of the network's cryptographic implementations. This helps ensure the confidentiality, integrity, and authenticity of data transmitted over the network.

In Step 304, based on the above scanning performed in Step 302, NF cryptography configuration information can be collected. As mentioned above, in some embodiments, NF cryptography configuration information can encompass the cryptographic settings and parameters associated with the NF (that is deployed within the network infrastructure). Such settings and parameters can correspond to ensuring the confidentiality, integrity and authenticity of data transmitted over the network.

According to some embodiments, NF cryptography configuration information can include, but is not limited to, encryption algorithms, key lengths, digital certificate configurations, cryptographic key management practices, and any other cryptographic parameters relevant to the operation of network functions. In some embodiments, NF cryptography configuration information may also include, but is not limited to, the management of cryptographic keys, including key generation, distribution, storage, rotation, and revocation, to maintain the security and confidentiality of cryptographic operations.

In some embodiments, such NF cryptography configuration information can be stored in database 108, as discussed above.

In Step 306, a cryptography status request can be received. For example, with reference to FIG. 7, CIM engine 200 can communicate a request to UE 102 (e.g., which is a NF having a corresponding CA). The request can request the CA, on behalf of the NF, perform a series of steps which can include, but are not limited to, verifying the request was received, creating a cryptography status report, then digitally signing and sending the report.

Accordingly, in Step 308, the cryptography state information for the NF can be determined (from the collected configuration information, as in Step 304), whereby the cryptography status report includes an identifier of the NF, the determined cryptography state information (e.g., whether an NF is PQC compliant, partially compliant and non-compliant) and an indication of whether the NF is upgradeable for post-quantum operations.

Figure 4:
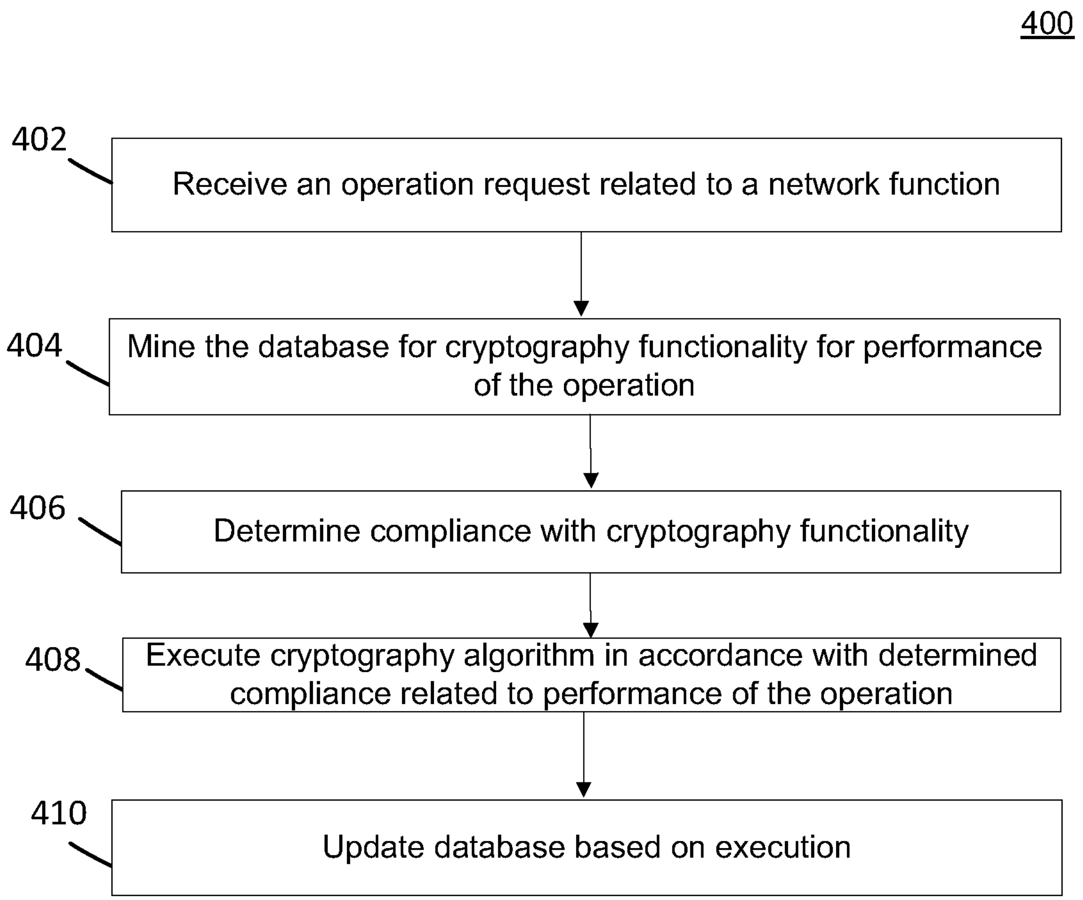
FIG. 4 illustrates an exemplary workflow according to some embodiments of the present disclosure.
Figure 5:
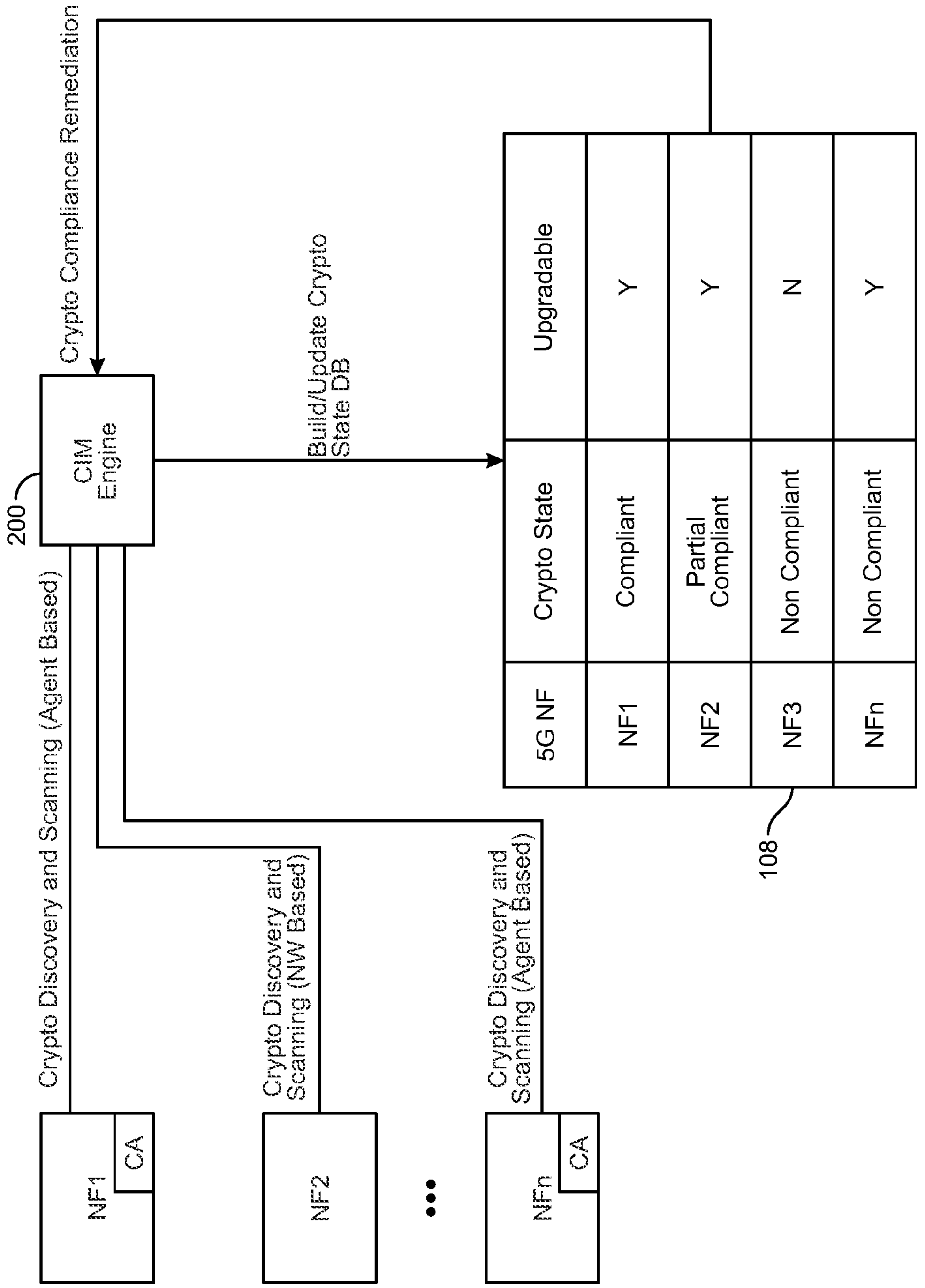
FIG. 5 depicts a non-limiting example embodiment of a network configuration and workflow according to some embodiments of the present disclosure.

By way of a non-limiting example, with reference to FIG. 5, depicted is a series of communications to/from $NF_1$, $NF_2$, . . . $NF_n$, whereby database 108 is populated with received cryptography status report information (e.g., unique NF identifier (ID), PQC keys, UP, CP and MP cryptography status, and the like). In the example in FIG. 5, the NFs are 5G NFs, and each NF has an associated CA besides NF, which uses the network (NW) function of the NF to communicate with the CIM engine 200. In some embodiments, the stored data in database 108 can be fed back to engine 200 (e.g., retrieved) to perform cryptography compliance remediation, as discussed below with respect to FIG. 4.

In Step 310, the compiled cryptography status report (along with the determined cryptography information) can be communicated in response to the request (from Step 306). Such communication, for example, can be sent by the CA of the NF, across the cryptography knowledge plane, to engine 200.

In Step 312, the integrity of the received cryptography state information (and entirety of the cryptography status report) can be verified. Such verification can be based on, but not limited to, digital signatures, hash functions, secure channels, timestamping, message authentication codes (MACs), and the like. As mentioned above, the communication is requested to be signed; therefore, the digital signature can be checked for its veracity to ensure the included information is accurate and proper. In some embodiments, if the verification results in an untrustworthy response, processing can proceed back to Step 306.

In Step 314, the cryptography information for the NF can be stored in the database (e.g., database 108). In some embodiments, the information for an NF can be updated in a similar manner. As depicted in FIG. 5, such information can be stored, and later utilized for performing agile crypto-processing for NFs.

According to some embodiments, FIG. 6 provides another non-limiting example of a populated database from a cryptography status report, which includes, for example, a unique NF ID, ID of the cryptography used, the cryptography state (e.g., partially compliant (PC), non-compliant (NC), for example), whether the NF/cryptography is upgradable and the PQ cryptography information. Such information can be compiled as per the processing of Process 300, discussed supra, and implemented via the processing of Process 400, discussed infra.

Turning to FIG. 4, Process 400 provides steps for implementing the stored data in database 108 as compiled and/or updated via Process 300, discussed supra. In some embodiments, as mentioned above, such implementation can involve performing cryptography compliance remediation, which involve rectifying cryptographic configurations, practices and/or implementations to meet security standards, regulatory requirements and organizational/cryptography policies.

As discussed herein, such remediation can involve an assessment that identifies discrepancies between existing cryptographic practices and compliance standards. This assessment entails reviewing configuration settings, cryptographic protocols, and key management practices. Subsequently, a gap analysis can be conducted to prioritize remediation efforts based on the severity of non-compliance and associated risks. A remediation plan can be developed to outline specific actions required to address identified gaps. These actions may involve updating configuration settings, enhancing key management processes, and/or deploying additional security controls. Upon implementation, validation ensures that remediation measures align with compliance requirements.

In some embodiments, continuous monitoring and maintenance can be performed to sustain compliance, which can involve, but is not limited to, regular audits, reviews and updates to adapt to evolving security threats. Ultimately, cryptography compliance remediation enhances security posture, mitigates risks and demonstrates adherence to regulatory mandates and industry standards, safeguarding sensitive data and communications within the network infrastructure.

According to some embodiments, Steps 402-408 of Process 400 can be performed by processing module 208 of CIM engine 200.

In some embodiments, Process 400 begins with Step 402 where an operation request related to a network function (NF) is received. For example, in some embodiments, a type of operation request received from a NF that requires a decision regarding a cryptographic algorithm is the establishment of a secure communication channel, such as a VPN connection. When a NF receives a request to establish a secure connection, the NF must determine the appropriate cryptographic algorithm to use for securing the communication. In some embodiments, such a decision can depend on factors such as, but not limited to, the security requirements of the communication, the performance characteristics of the cryptographic algorithms, and compatibility with other network components. For example, the NF may need to select an encryption algorithm such as AES for securing the data transmitted over the VPN tunnel. Additionally, considerations regarding key management, authentication mechanisms and compliance requirements may influence the choice of cryptographic algorithm.

In Step 404, based on the operation request, engine 200 can mine the database for cryptography functionality for performance of the operation. For example, engine 200 can search for information related to the NF based on the NF ID. Accordingly, as in Step 406, for the NF, the cryptography functionality (e.g., cryptography state) can be identified. As mentioned above, such functionality can involve switching between cryptography algorithms to comply with requested and/or executable functionality (e.g., from classical to post quantum, from classical to hybrid, for example).

Then, in Step 408, the cryptography algorithm related to the cryptography functionality (from Step 406) can be executed, which enables the performance of the requested operation. This enables a secure and efficient network entity operation to be performed via a proper cryptography algorithm that securely and properly executes the requested operations while securely maintaining the integrity of the operating environment. Accordingly, the NF can perform task specific operations via the executed, specifically identified algorithm that can reduce loss and improve security and efficiency.

In Step 410, the database can be updated based on the remediation operation performed in Step 408. Such updating can be performed in a similar manner as discussed above, whereby the cryptography information for the NF can be maintained in a real-time, up-to-date manner that reflects its most recent operations.

Figure 8:
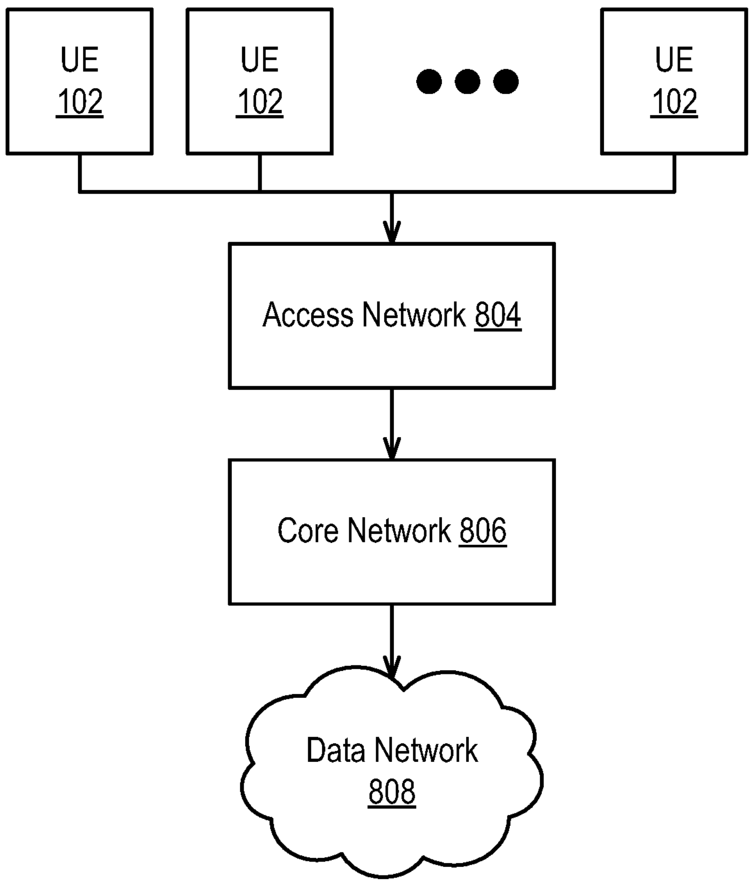
FIG. 8 illustrates a non-limiting example embodiment of a network architecture according to some embodiments of the present disclosure.

FIG. 8 is a block diagram of an example network architecture according to some embodiments of the present disclosure. In the illustrated embodiment, UE 102 accesses a data network 808 via an access network 804 and a core network 806.

In the illustrated embodiment, the access network 804 comprises a network allowing network communication with UE 102. In general, the access network 804 includes at least one base station that is communicatively coupled to the core network 806 and coupled to zero or more UE 102.

In some embodiments, the access network 804 comprises a cellular access network, for example, a 5G network. In an embodiment, the access network 804 can include a NextGen Radio Access Network (NG-RAN). In an embodiment, the access network 804 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 804 provides access to a core network 806 to UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 806 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 806 and to external network-attached elements in a data network 808 such as the Internet.

In the illustrated embodiment, the access network 804 and the core network 806 are operated by a NO. However, in some embodiments, the networks (804, 806) may be operated by a private entity and may be closed to public traffic. For example, the components of the network 806 may be provided as a single device, and the access network 804 may comprise a small form-factor base station. In these embodiments, the operator of the device can simulate a cellular network, and UE 102 can connect to this network similar to connecting to a national or regional network.

In some embodiments, the access network 804, core network 806 and data network 808 can be configured as a MEC network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

Figure 9:
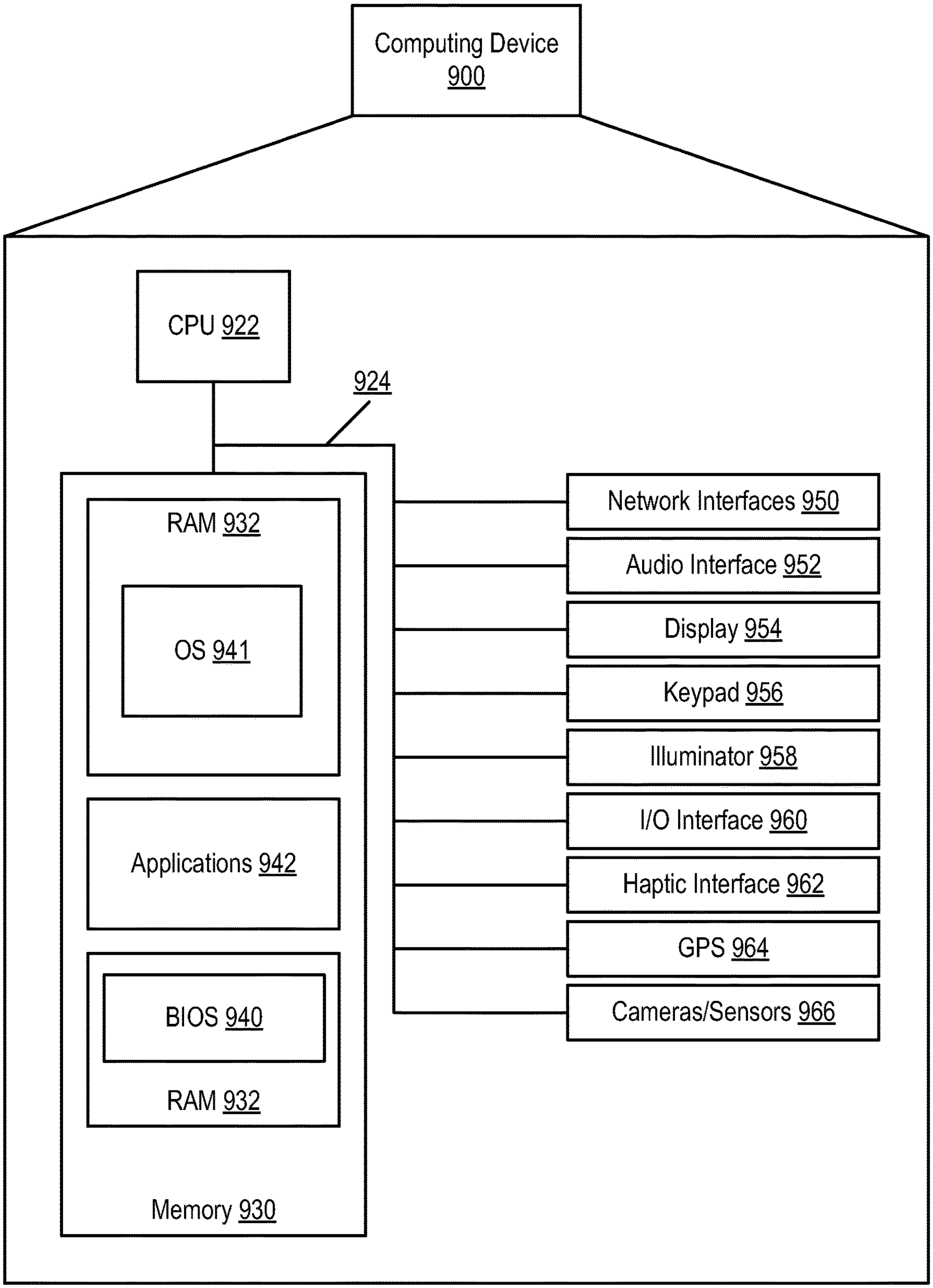
FIG. 9 is a block diagram illustrating a computing device showing an example of a client or server device used in various embodiments of the present disclosure.

FIG. 9 is a block diagram illustrating a computing device showing an example of a client or server device used in the various embodiments of the disclosure.

The computing device 900 may include more or fewer components than those shown in FIG. 9, depending on the deployment or usage of the device 900. For example, a server computing device, such as a rack-mounted server, may not include audio interfaces 952, displays 954, keypads 956, illuminators 958, haptic interfaces 962, GPS receivers 964, or cameras/sensors 966. Some devices may include additional components not shown, such as graphics processing unit (GPU) devices, cryptographic co-processors, artificial intelligence (AI) accelerators, or other peripheral devices.

As shown in FIG. 9, the device 900 includes a CPU 922 in communication with a mass memory 930 via a bus 924. The computing device 900 also includes one or more network interfaces 950, an audio interface 952, a display 954, a keypad 956, an illuminator 958, an input/output interface 960, a haptic interface 962, an optional global positioning systems (GPS) receiver 964 and a camera(s) or other optical, thermal, or electromagnetic sensors 966. Device 900 can include one camera/sensor 966 or a plurality of cameras/sensors 966. The positioning of the camera(s)/sensor(s) 966 on the device 900 can change per device 900 model, per device 900 capabilities, and the like, or some combination thereof.

In some embodiments, the CPU 922 may comprise a general-purpose CPU. The CPU 922 may comprise a single-core or multiple-core CPU. The CPU 922 may comprise a system-on-a-chip (SoC) or a similar embedded system. In some embodiments, a GPU may be used in place of, or in combination with, a CPU 922. Mass memory 930 may comprise a dynamic random-access memory (DRAM) device, a static random-access memory device (SRAM), or a Flash (e.g., NAND Flash) memory device. In some embodiments, mass memory 930 may comprise a combination of such memory types. In one embodiment, the bus 924 may comprise a Peripheral Component Interconnect Express (PCIe) bus. In some embodiments, the bus 924 may comprise multiple busses instead of a single bus.

Mass memory 930 illustrates another example of computer storage media for the storage of information such as computer-readable instructions, data structures, program modules, or other data. Mass memory 930 stores a basic input/output system ("BIOS") 940 for controlling the low-level operation of the computing device 900. The mass memory also stores an operating system 941 for controlling the operation of the computing device 900.

Applications 942 may include computer-executable instructions which, when executed by the computing device 900, perform any of the methods (or portions of the methods) described previously in the description of the preceding Figures. In some embodiments, the software or programs implementing the method embodiments can be read from a hard disk drive (not illustrated) and temporarily stored in RAM 932 by CPU 922. CPU 922 may then read the software or data from RAM 932, process them, and store them to RAM 932 again.

The computing device 900 may optionally communicate with a base station (not shown) or directly with another computing device. Network interface 950 is sometimes known as a transceiver, transceiving device, or network interface card (NIC).

The audio interface 952 produces and receives audio signals such as the sound of a human voice. For example, the audio interface 952 may be coupled to a speaker and microphone (not shown) to enable telecommunication with others or generate an audio acknowledgment for some action. Display 954 may be a liquid crystal display (LCD), gas plasma, light-emitting diode (LED), or any other type of display used with a computing device. Display 954 may also include a touch-sensitive screen arranged to receive input from an object such as a stylus or a digit from a human hand.

Keypad 956 may comprise any input device arranged to receive input from a user. Illuminator 958 may provide a status indication or provide light.

The computing device 900 also comprises an input/output interface 960 for communicating with external devices, using communication technologies, such as USB, infrared, Bluetooth™, or the like. The haptic interface 962 provides tactile feedback to a user of the client device.

The optional GPS transceiver 964 can determine the physical coordinates of the computing device 900 on the surface of the Earth, which typically outputs a location as latitude and longitude values. GPS transceiver 964 can also employ other geo-positioning mechanisms, including, but not limited to, triangulation, assisted GPS (AGPS), E-OTD, CI, SAI, ETA, BSS, or the like, to further determine the physical location of the computing device 900 on the surface of the Earth. In one embodiment, however, the computing device 900 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:

scanning a network for information related to a network function (NF);

collecting, based on the scanning, cryptography configuration information for the NF;

determining, based on the collected cryptography configuration information, a cryptography status report, the cryptography status report comprising a determined cryptography state for the NF;

storing, in a database, the cryptography status report;

receiving, in relation to the NF, a request for the NF to perform an operation;

mining the database, and based on information from the cryptography status report stored in the database, determining a type of cryptography algorithm for the NF and the operation; and causing execution of a cryptography algorithm of the determined type.

2. The method of claim 1, further comprising:

receiving, over the network, a request for the cryptography status report, the request comprising instructions for verifying reception of the request and digitally signing the cryptography status report.

3. The method of claim 2, further comprising:

storing the cryptography status report based on verification of the cryptography status report based on the digital signing of the cryptography status report.

4. The method of claim 1, further comprising:

scanning of the network to identify a cryptography plane on the network, the cryptography plane corresponding to a three-dimensional (3D) plane on the network, the 3D plane comprising a management plane, a signaling plane, and a user plane.

5. The method of claim 4, further comprising:

scanning the network via a cryptography agent (CA) associated with each of the management plane, the signaling plane, and the user plane.

6. The method of claim 1, wherein the determined cryptography state for the NF comprises at least one of post-quantum cryptography (PQC) compliant, partially compliant, or non-compliant.

7. The method of claim 6, wherein the determined cryptography state is further based on cryptography policy that corresponds to at least one of a classical algorithm, a post-quantum algorithm, or a hybrid cryptography algorithm.

8. The method of claim 1, wherein the storage of the cryptography status report comprises updating entries into the database for the NF.

9. A device comprising:

a processor configured to:

scan a network for information related to a network function (NF);

collect, based on the scanning, cryptography configuration information for the NF;

determine, based on the collected cryptography configuration information, a cryptography status report, the cryptography status report comprising a determined cryptography state for the NF;

store, in a database, the cryptography status report;

receive, in relation to the NF, a request for the NF to perform an operation;

mine the database, and based on information from the cryptography status report stored in the database, determine a type of cryptography algorithm for the NF and the operation; and cause execution of a cryptography algorithm of the determined type.

10. The device of claim 9, wherein the processor is further configured to:

receive, over the network, a request for the cryptography status report, the request comprising instructions for verifying reception of the request and digitally signing the cryptography status report.

11. The device of claim 10, wherein the processor is further configured to:

store the cryptography status report based on verification of the cryptography status report based on the digital signing of the cryptography status report.

12. The device of claim 9, wherein the processor is further configured to:

scan the network to identify a cryptography plane on the network, the cryptography plane corresponding to a three-dimensional (3D) plane on the network, the 3D plane comprising a management plane, a signaling plane, and a user plane.

13. The device of claim 12, wherein the processor is further configured to:

scan the network via a cryptography agent (CA) associated with each of the management plane, the signaling plane, and the user plane.

14. The device of claim 9, wherein the processor is further configured to:

determine whether the cryptography state for the NF comprises at least one of post-quantum cryptography (PQC) compliant, partially compliant, or non-compliant.

15. The device of claim 14, wherein the determined cryptography state is further based on cryptography policy that corresponds to at least one of a classical algorithm, a post-quantum algorithm, or a hybrid cryptography algorithm.

16. The device of claim 9, wherein the storage of the cryptography status report comprises updating entries into the database for the NF.

17. A non-transitory computer-readable storage medium tangibly encoded with computer-executable instructions that, when executed by a processor, perform a method comprising:

scanning a network for information related to a network function (NF);

collecting, based on the scanning, cryptography configuration information for the NF;

determining, based on the collected cryptography configuration information, a cryptography status report, the cryptography status report comprising a determined cryptography state for the NF;

storing, in a database, the cryptography status report;

receiving, in relation to the NF, a request for the NF to perform an operation;

mining the database, and based on information from the cryptography status report stored in the database, determining a type of cryptography algorithm for the NF and the operation; and causing execution of a cryptography algorithm of the determined type.

18. The non-transitory computer-readable storage medium of claim 17, wherein the determined cryptography state for the NF comprises at least one of post-quantum cryptography (PQC) compliant, partially compliant, or non-compliant, wherein the determined cryptography state is further based on cryptography policy that corresponds to at least one of a classical algorithm, a post-quantum algorithm, or a hybrid cryptography algorithm.

* * * * *